Nov. 1, 1927.　　　　H. H. BOYCE　　　1,647,171

TEMPERATURE INDICATING INSTRUMENT FOR MOTOR VEHICLES

Filed Jan.19, 1918

Inventor
Harrison H. Boyce.
By his Attorney
Edmund Quincy Moses

Patented Nov. 1, 1927.

1,647,171

UNITED STATES PATENT OFFICE.

HARRISON H. BOYCE, OF FOREST HILLS, NEW YORK.

TEMPERATURE-INDICATING INSTRUMENT FOR MOTOR VEHICLES.

Application filed January 19, 1918. Serial No. 212,635.

This invention relates to temperature indicating devices and particularly to instruments intended to be utilized for indicating the thermal condition of internal combustion motors of aeroplanes, automobiles and the like. The importance of an instrument for indicating to the driver of a vehicle the thermal condition of the engine thereof is now well recognized as such an engine cannot be operated satisfactorily and economically, or even safely, except at proper temperatures. The function of a temperature indicating instrument for this purpose, however, is really a dual one; that is to say, in the first place, the instrument should perform the function of indicating exact temperatures so as to enable the driver to make proper adjustments of the carburetor, spark, radiator cover, etc., and also, particularly in aeroplane work, to enable him to observe the warming up process of the engine with great care so that the start may be made at the proper time. Secondly, the instrument should perform the function of a danger signal calling the attention of the operator to any unusual condition resulting in heating to a point of excessive and harmful temperature. The two functions of the instrument are not ordinarily performed most effectively by identical instrumentalities; thus for the accurate indication of temperatures, a numerical scale divided into numerous small divisions is required, while for the danger signal, it is desirable to have a more pronounced but less exact indication, which not only can be easily read but is preferably of such character as to force itself upon the attention of the driver.

The principal object of the present invention is to provide an instrument having a plurality of indicating devices of different characters adapted to facilitate the correct observation of the instrument in such a way that its dual function above described shall be most effectively performed.

Figure 2:
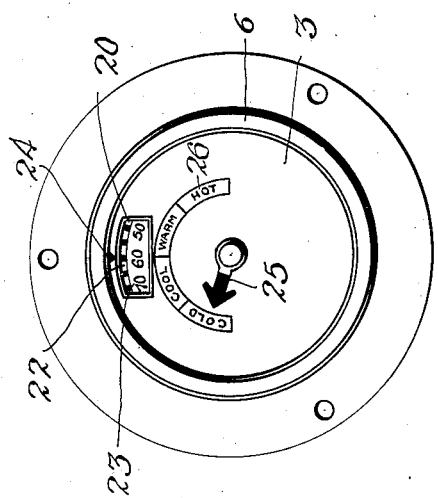
Figure 1:
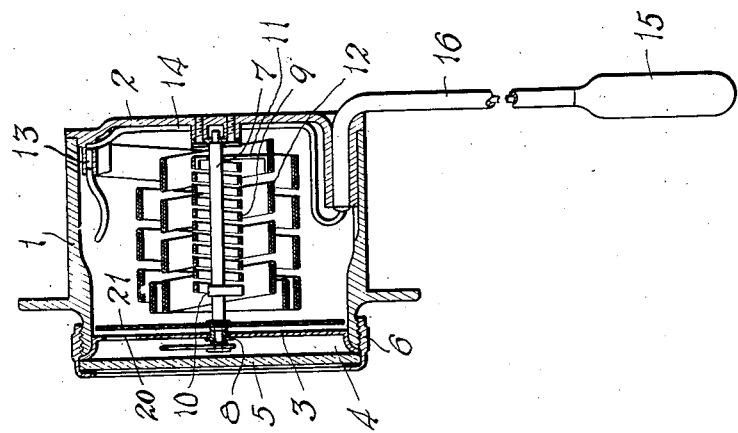

In the accompanying drawings, which form a part of this specification and in which I have illustrated one preferred embodiment of the invention, Figure 1 is a vertical sectional view of the instrument. Figure 2 is a face view thereof.

The mechanism of the instrument by which it is caused to respond to temperature variations forms no part of the present invention and may be of any suitable character. For purposes of illustration, I have shown an instrument comprising briefly a casing 1, the rear end of which is closed by a back plate 2 and in the front of which fits a dial plate 3, depressed below the front edge of the casing so as to leave a space 4. The front of the space 4 is closed by a crystal 5 retained in position by a bezel 6. Mounted in the casing is an arbor 7, the rear end of which is supported by the back plate, while the front end projects through bushing 8 in the dial. Surrounding the arbor is a bi-metallic compensating coil 9, one end of which is secured to the arbor 10 and the other end of which is secured to one end of a lever 11. The other end of the lever 11 is secured to the free end of a Bourdon coil 12 mounted on the back plate at the point 13. The fixed end of the Bourdon coil is connected to a capillary tube 14, which is led out of the casing and connects with a bulb 15 located at the point where it is desired to take the temperature. The bulb may be located in any suitable location depending upon the purpose for which the instrument is to be used. For instance, it may be placed in the return pipe of the cooling system of an automobile or aeroplane engine, as disclosed in my patent No. 1,206,783, dated November 28, 1916. The capillary tube 14 is preferably enclosed in a protective and thermally insulating casing 16. Changes in the temperature of the bulb 15 will cause the expansion or contraction of the liquid contained therein, which acting through the column of liquid in the capillary tube increases or decreases the pressure in the Bourdon coil, which winds up more closely or unwinds, thereby rotating the arbor. The bi-metallic coil 9 acts as a compensating element operating in opposition to the movements of the Bourdon coil, so as to correct for local temperature changes within the instrument itself.

The present invention relates to the construction of the indicating devices, which in the present instance are actuated by the rotation of the arbor 7. In the construction illustrated the dial plate 3 is provided with a window 20. Mounted on the arbor 7 behind the dial plate is a disc 21 bearing on its face suitable scale divisions 22 and degree indicia 23. The rotation of the disc, it will be seen, will present the proper numeral in position to be observed through the window. The dial plate is preferably also provided with an index 24 adapted to cooperate with the scale divisions, so as to enable an accurate observation of the temperature to be made. The disc 21 with the divisions and numerals thereon cooperating with the window and index 24 provides for an accurate indication of the temperature, such as is desirable for testing purposes, making adjustments and for close observation of the operation of the engine. These devices, however, are not the most effective for enabling the general engine condition to be observed at a glance as is desirable during actual driving conditions. Under such conditions, the time and opportunity for close observation are frequently lacking, but it is nevertheless important that the driver should know the approximate state of the engine and positively if any condition of danger arises. I accordingly provide a separate indicating element which will convey the necessary general information by its mere position.

In the present construction, I provide for this purpose a short and comparatively broad and easily visible hand 25 mounted in front of the dial on the end of the arbor projecting therethrough. This hand by the angle at which it stands will indicate at once to the operator, the general condition of the engine. If desired, a series of designations 26 may be arranged with which this hand cooperates, but this is not essential.

With the instrument described, it will be seen that the hand forms a clear and instant means enabling the operator to observe the general condition of the engine and showing at a glance the existence of a condition of danger, but which, at the same time, cannot be confused with the more exact but less easily read indications given by the scale and numerals appearing through the window.

While I have shown and described in detail one preferred embodiment of my invention, it is to be understood that modifications may be made therein and I do not, therefore, desire to be limited to the exact construction shown, but intend to cover my invention broadly in whatever form its principle may be embodied.

Having thus described my invention, I claim:

1. In an instrument for indicating engine temperatures of a motor vehicle engine, the combination of a dial bearing an index and a scale of words designating temperature conditions, an arbor, means for rotating the arbor in accordance with the temperature variations, and a plurality of indicating elements carried by the arbor and cooperating with the dial, one of said elements being designed to cooperate with said index to indicate the exact temperature and the other element cooperating with said word scale to indicate in words the corresponding temperature condition of the engine.

2. In an instrument of the character described, the combination of a casing, a dial in the forward part thereof, operating means within the casing responsive to temperature changes, a disc carrying degree indicia connected with said operating mechanism and mounted in rear of said dial, said dial having a window therein through which the proper degree indicia may be observed, and an index hand also operated by said operating mechanism and mounted in front of said dial, said dial bearing a scale of words designating temperature conditions with which said index hand cooperates.

3. In an instrument of the character described, a fixed index, a rotatable disc operatively associated therewith carrying a degree scale cooperating with said index to indicate exact temperature, a fixed scale of words designating temperature conditions, a rotatable index hand cooperating therewith to indicate approximate temperature, and means responsive to temperature variations for simultaneously rotating said disc and said index hand, whereby the exact temperature and the approximate temperature may be ascertained at any moment.

4. In an instrument of the character described, a casing, an arbor journaled therein, a dial plate in said casing through which the forward end of said arbor projects, said dial plate having a window therein at one side of the forward end of said arbor and having a fixed scale of words between said window and said arbor indicative of approximate temperatures, a disc carrying a degree scale mounted on said arbor in rear of said dial plate, a portion of said degree scale being visible through said window, said dial plate being provided with a fixed index cooperating with the portion of the degree scale visible through said window to indicate the exact temperature, an index hand mounted on the forward end of said arbor and cooperating with said fixed word scale to indicate the approximate temperature, and means responsive to temperature variations for rotating said arbor.

5. In an instrument of the character described, the combination of a casing, a Bourdon coil therein, an arbor journaled in said casing and having operative connection with said coil, a dial plate in said casing through which the forward end of said arbor projects, a disc carrying a degree scale mounted on said arbor in rear of said dial plate, said dial plate having a window therein through which the degree indicia on said disc may be observed, and an index hand carried by the projecting end of said arbor in front of said dial, said dial having a scale of words designating temperature conditions with which said index hand cooperates.

6. In an instrument of the character described, the combination of a gage, a bulb, a capillary tube connecting said gage and bulb, said gage comprising a casing having a pressure-responsive element therein communicating with said capillary tube, an arbor rotatably mounted in the casing and operatively connected with said pressure-responsive element, a dial plate mounted in the forward part of the casing, an end of said arbor projecting through an opening in said dial plate, said dial plate having a window therein at one side of said opening, and bearing a scale of words designating temperature conditions, the projecting end of said arbor carrying an index hand in front of said dial plate adapted to cooperate with said word scale, said arbor carrying a disc in rear of said dial plate, said disc bearing a numerical degree scale, the portion of which corresponding to the temperature indicated by the instrument being visible through the window in the dial plate.

7. In an instrument of the character described, the combination of a gage, a bulb, a capillary tube connecting said gage and bulb, said gage comprising a casing having a Bourdon coil therein, an arbor rotatably mounted in said casing, a thermally responsive compensating element connecting said Bourdon coil and arbor, a dial plate mounted in the forward part of said casing, a crystal enclosing a space in front of said dial plate, an end of said arbor projecting through an opening of said dial plate into said space, said dial plate having a small window therein, and bearing a scale of words designating temperature conditions, the projecting end of said arbor carrying an index hand in front of said dial plate adapted to cooperate with said word scale, said arbor carrying a disc in rear of said dial plate, said disc bearing a numerical degree scale, the portion of which corresponding to the temperature indicated by the instrument being visible through the window in the dial plate.

HARRISON H. BOYCE.